United States Patent [19]
Gilb

[11] Patent Number: 5,419,649
[45] Date of Patent: May 30, 1995

[54] INTERMEDIATE RAIL TO POST CONNECTION

[75] Inventor: Tyrell T. Gilb, Berkeley, Calif.

[73] Assignee: Simpson Strong-Tie Co., Inc., Pleasanton, Calif.

[21] Appl. No.: 194,403

[22] Filed: Feb. 10, 1994

[51] Int. Cl.6 .............................................. F16B 9/00
[52] U.S. Cl. ................................ 403/231; 403/232.1; 403/403; 52/702; 52/712; 411/461
[58] Field of Search ............... 403/232.1, 231, 403, 403/382, 205, 283, 230; 256/65, 69, 68; 52/702, 712; 411/461–465

[56] References Cited

U.S. PATENT DOCUMENTS

| | | | |
|---|---|---|---|
| 4,480,941 | 11/1984 | Gilb et al. ........................ | 403/232.1 |
| 4,730,971 | 3/1988 | Lin .................................... | 52/712 X |
| 4,965,980 | 10/1990 | Leavens ............................ | 52/702 X |
| 5,027,573 | 7/1991 | Commins ........................... | 52/489 |
| 5,071,280 | 12/1991 | Turner ............................... | 52/702 X |
| 5,160,211 | 11/1992 | Gilb .................................... | 403/231 |

Primary Examiner—Randolph A. Reese
Assistant Examiner—Anthony Knight
Attorney, Agent, or Firm—James R. Cypher

[57] ABSTRACT

An intermediate rail to post connection including a sheet metal connector for attaching a wood intermediate rail to a wood post is disclosed. The sheet metal connector is preferably formed with a base member, an integral seat member and a post engaging flange. Preferably four fasteners which may be either screws or nails are inserted through suitable openings in the sheet metal connector. Two of the fasteners pierce the sheet metal connector, the intermediate rail and the post in such a way as to be in double shear. The other two fasteners are inserted through the sheet metal connector directly into the wood post. The sheet metal connector is placed on the underside of the intermediate rail and all fasteners are therefor inserted from the underside of the intermediate rail.

9 Claims, 4 Drawing Sheets

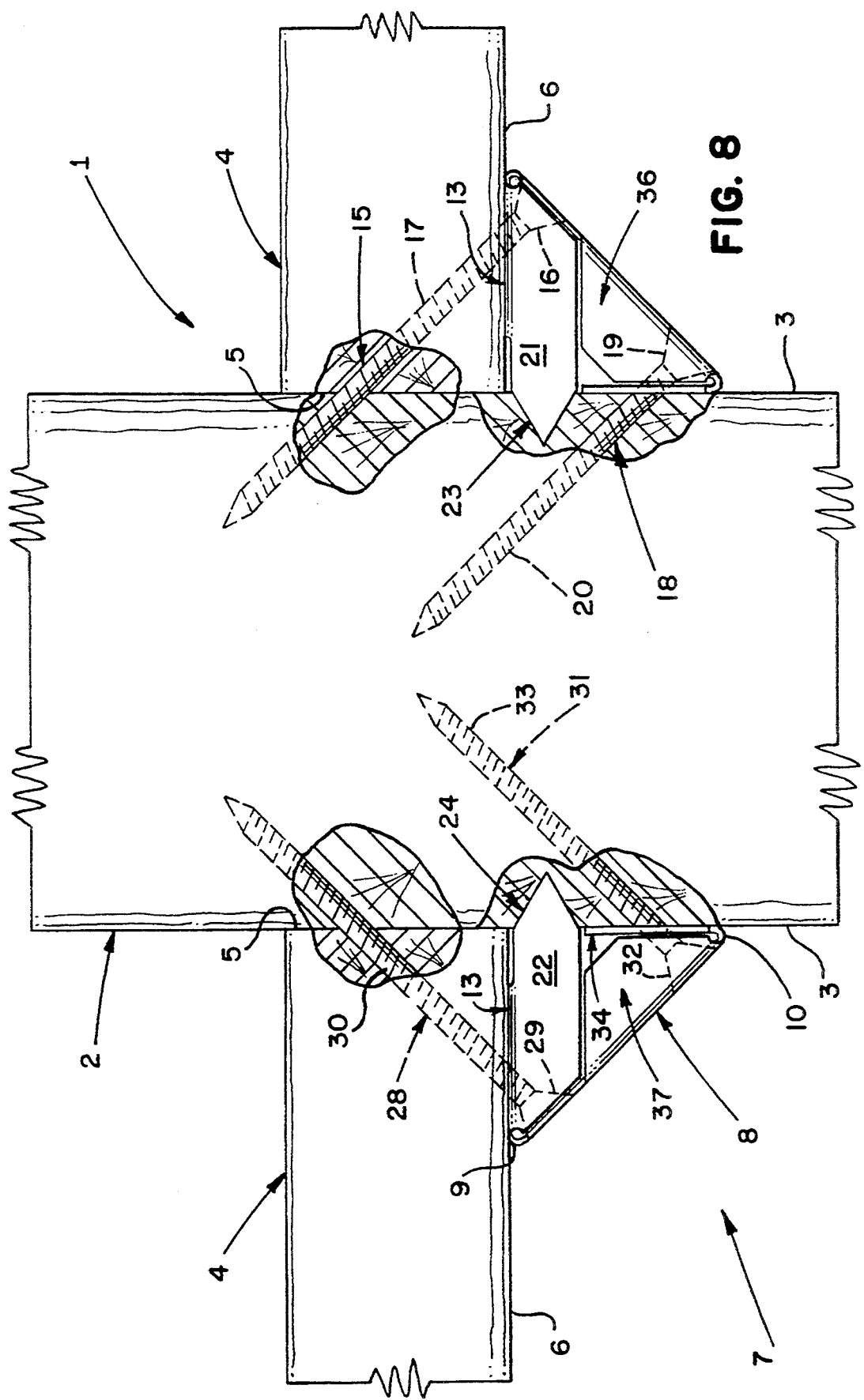

INTERMEDIATE RAIL TO POST CONNECTION

BACKGROUND

This invention relates to a connection for joining intermediate wood railings to a wood post.

The standard way of joining an intermediate wood railing to a wood post is by driving nails in at an angle through the intermediate railing and into the post with a hammer. This is known as "toe-nailing". This method of installation is time consuming and most amateurs are unable to toe-nail without splitting the ends of the intermediate rail. Contractors who have nailing guns can install nails by toe nailing, but nailing guns are quite expensive and beyond the budget of most weekend carpenters commonly known as DIY'ers. Even using a nailing gun, tow-nailing is not very strong as the nails are only in single shear as opposed to double shear where load values are nearly double.

SUMMARY OF THE DISCLOSURE

Use of the intermediate rail to post connector of the present invention nearly doubles the holding power of a connection constructed by conventional toe-nailing.

The connector of the present invention is formed with prongs which make it easier to install the rail since the connector forms a temporary jig for locating the rail before the rail is attached either by nails or screws.

The sheet metal connector may be used with intermediate rails and posts of every dimension.

The strength of the connection is increased since four instead of two fasteners are inserted into the post from the underside of the intermediate rail. In addition, two of the four nails are in double shear.

The fasteners are partially concealed since none of the nails or screws are inserted through the top surface of the intermediate rail, thus improving the appearance of the connection and eliminating openings in the wood in the top face for entry of water.

Only two nails are inserted through the end of the intermediate rail instead of the usual two on top and two underneath the intermediate rail which tends to split the end of the rail.

FIG. 8 is a side view of the intermediate rail to post connection of the present invention with portions of the post and railing in cross section for purposes of clarification.

BRIEF DESCRIPTION OF THE INVENTION

Figure 1:
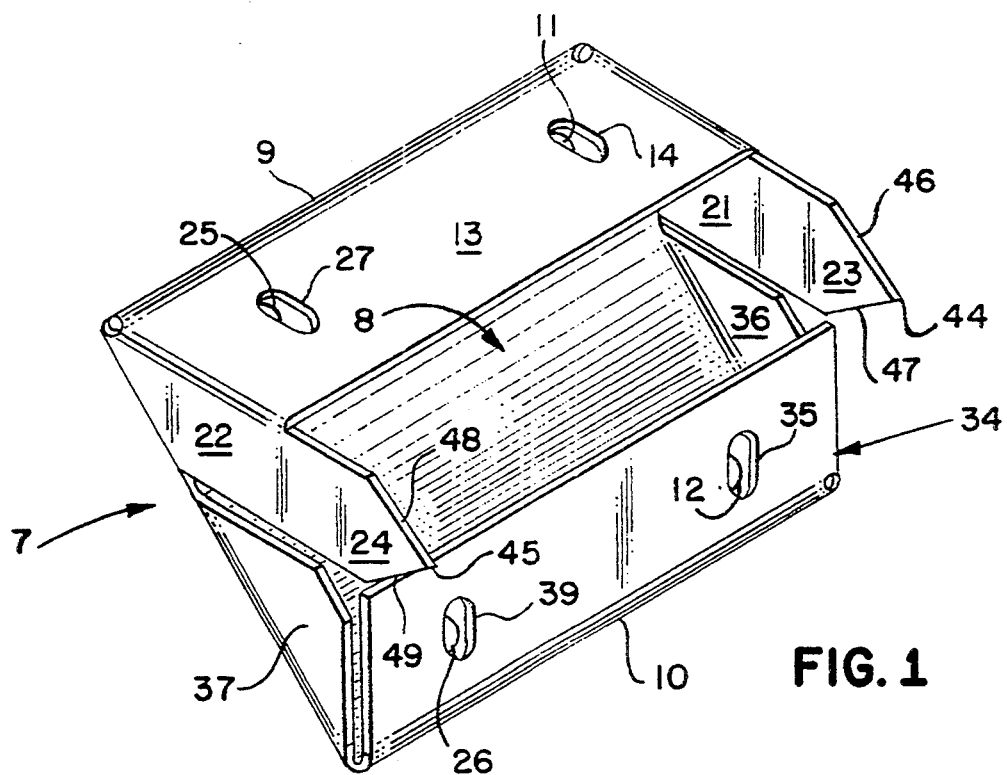
FIG. 1 is a perspective view of the connector of the present invention.
Figure 2:
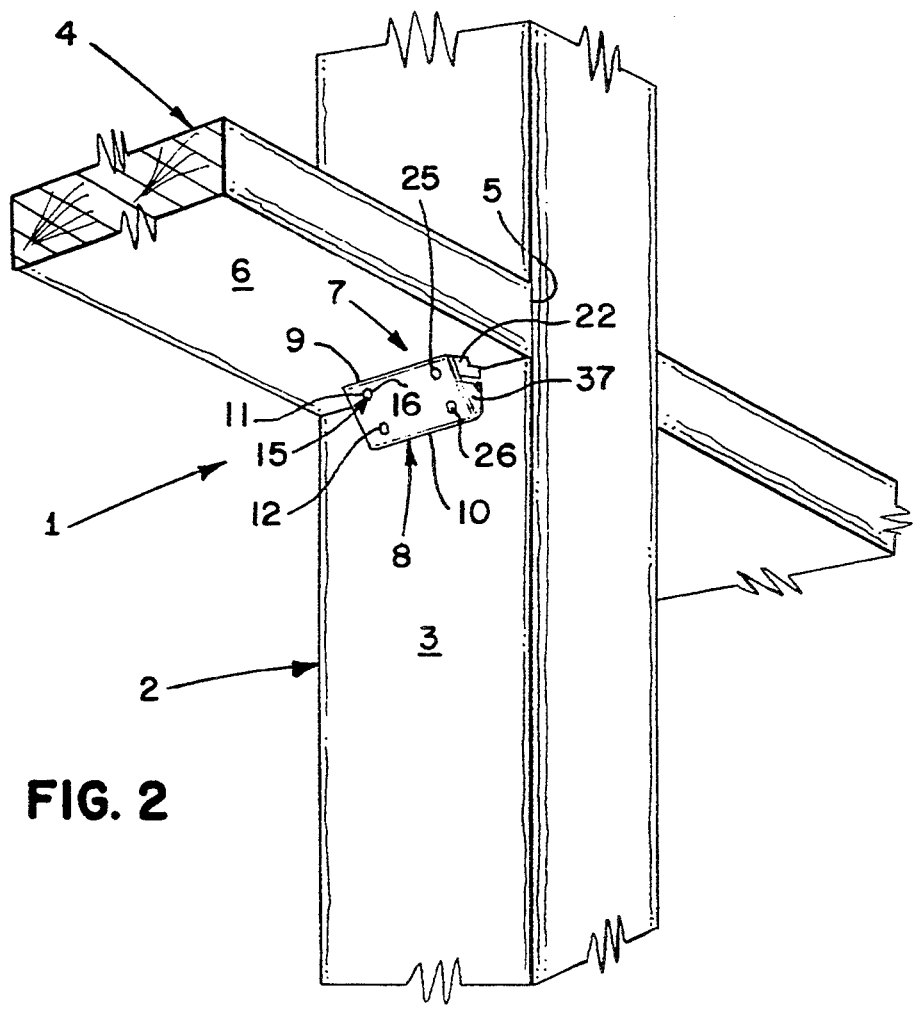
FIG. 2 is a perspective of the connector illustrated in FIG. 1 connected to a post and an intermediate rail forming the intermediate rail to post connection of the present invention.
Figure 3:
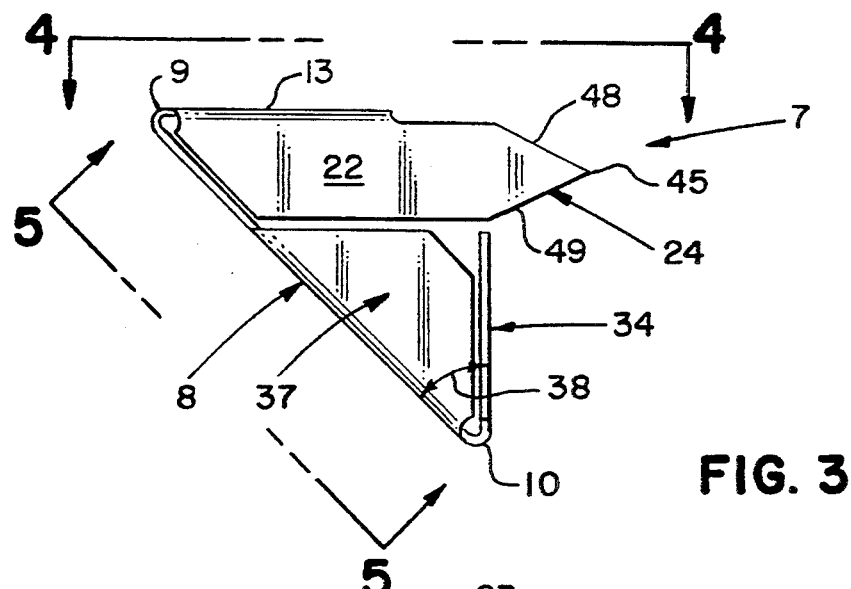
FIG. 3 is a side view of the connector illustrated in FIG. 1.
Figure 4:
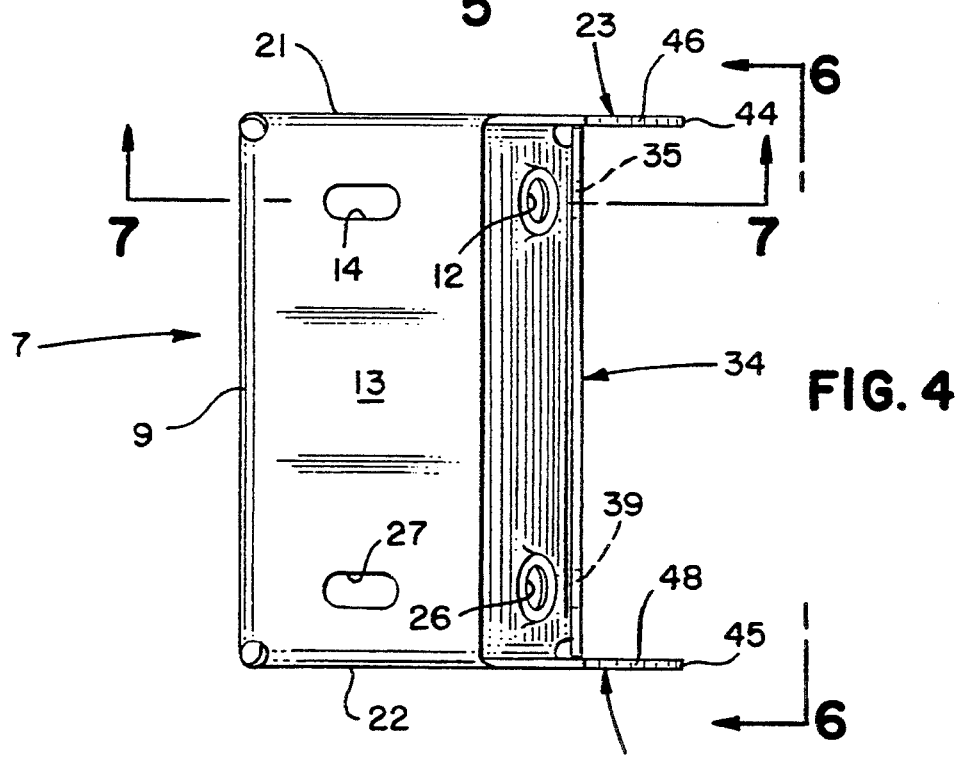
FIG. 4 is a top plan view of the connector illustrated in FIG. 3 taken generally along line 4—4.
Figure 5:
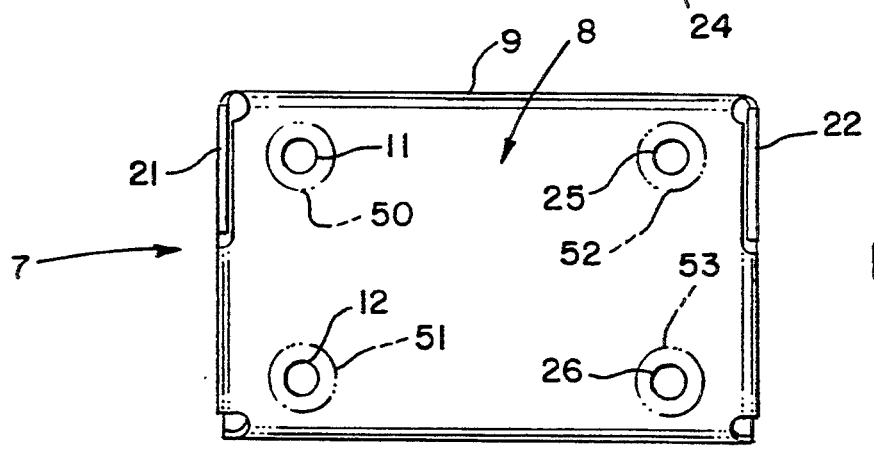
FIG. 5 is an end view of the connector illustrated in FIG. 3 taken along line 5—5.
Figure 6:
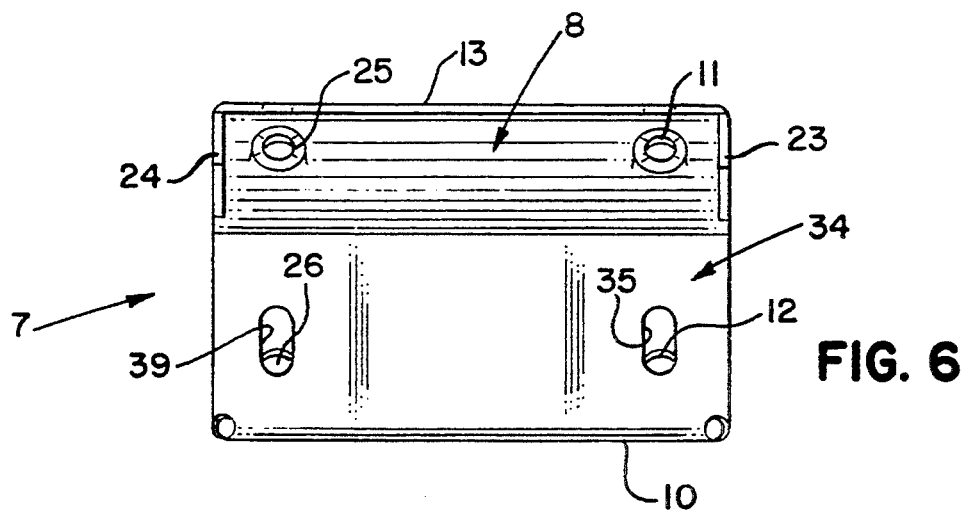
FIG. 6 is a view of the other end of the connector illustrated in FIG. 4 and taken along line 6—6.
Figure 7:
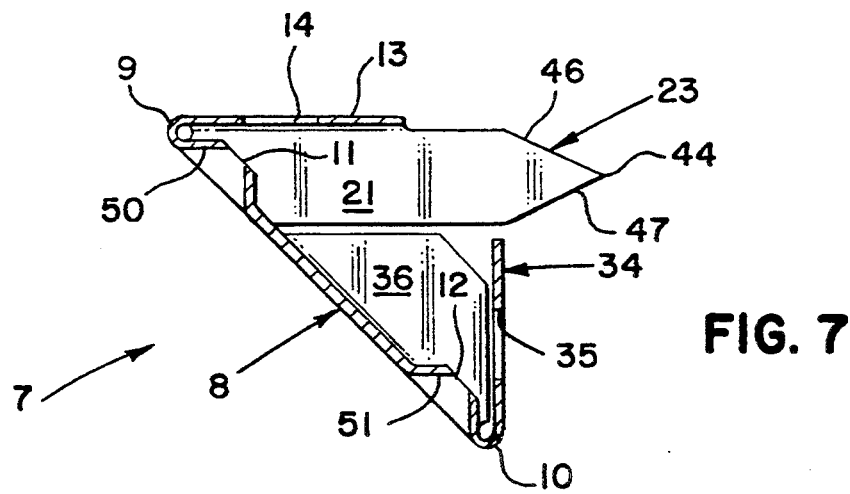
FIG. 7 is a cross sectional view of the connector illustrated in FIG. 4 taken along line 7—7.

The intermediate rail to post connection 1 of the present invention consists of: a wood supporting post 2 having a side face 3; an intermediate wood rail 4 having an end face 5 in registration with the side face 3 of the wood supporting post 2, and a bottom face 6; a sheet metal connector 7 including: a base member 8 having a top edge 9 in registration with the bottom face 6 of the intermediate wood rail 4, and a bottom edge 10 in registration with the side face 3 of the wood supporting post 2 and formed with a first upper fastener opening 11 and a first lower fastener opening 12; a seat member 13 integrally connected to the top edge 9 of the base member 8 in registration with the bottom face 6 of the intermediate wood railing 4 and formed with a first seat opening 14 therethrough; a first upper fastener member 15 in double shear having an enlarged head 16 in engagement with the base member 8 and a shank 17 inserted through and in registration with the sides of the first upper fastener opening 11 in the base member 8, through the bottom face 6 and the end face 5 of the intermediate wood rail 4 and into the wood supporting post 2; and a first lower fastener member 18 in single shear having an enlarged head 19 in engagement with the base member 8 and a shank 20 inserted through the first lower fastener opening 12 in the base member 8 and into the wood supporting post 2.

The intermediate rail to post connection 1 may also include a pair of side members 21 and 22 integrally connected to opposite sides of the seat member 13 at an angle thereto for stiffening the seat member 13.

Another feature of the intermediate rail to post connection 1 is that it may include a pair of prong members 23 and 24 integrally connected to the pair of side members 21 and 22 extending into the wood supporting post 2.

Still another feature of the intermediate rail to post connection 1 is that the base member 8 may be formed with a second upper fastener opening 25 and a second lower fastener opening 26; the seat member 13 may be formed with a second seat opening 27 therethrough; a second upper fastener member 28 in double shear having an enlarged head 29 in engagement with the base member 8 and a shank 30 may be inserted through the second upper fastener opening 25 in the base member 8, through the second seat opening 27 in the seat member 13, through the bottom face 6 and the end face 5 of the intermediate wood rail 4 and into the wood supporting post 2; and a second lower fastener member 31 in single shear having an enlarged head 32 in engagement with the base member 8 and a shank 33 may be inserted through the second lower fastener opening 26 in the base member 8, and into the wood supporting post 2.

In another form of the invention, the intermediate rail to post connection may consist of: a wood supporting post 2 having a side face 3; an intermediate wood rail 4 having an end face 5 in registration with the side face 3 of the wood supporting post 2, and a bottom face 6; a sheet metal connector 7 including: a base member 8 having a top edge 9 in registration with the bottom face 6 of the intermediate wood rail 4, and a bottom edge 10 in registration with the side face 3 of the wood supporting post 2 and formed with a first upper fastener opening 11 and a first lower fastener opening 12; a first upper fastener member 15 in double shear having an enlarged head 16 in engagement with the base member 8 and a shank 17 inserted through the first upper fastener opening 11 in the base member 8, through the bottom face 6 and the end face 5 of the intermediate wood rail 4 and into the wood supporting post 2; and a first lower fastener member 18 in single shear having an enlarged head 19 in engagement with the base member 8 and a shank 20 inserted through the first lower fastener opening 12 in the base member 8 and into the wood supporting post 2.

The intermediate rail to post connection 1 may also include: a post engaging flange 34 integrally connected to the bottom edge 10 of the base member 8 at an acute angle 38 for stiffening the base member 8 and formed with a flange first fastener opening 35 therethrough; and the first lower fastener member 18 in single shear is inserted through the flange first fastener opening 35 in the post engaging flange 34.

The intermediate rail to post connection 1 may also include a pair of base side flanges 36 and 37 integrally connected to opposite sides of the base member 8 for stiffening the base member 8.

The intermediate rail to post connection 1 may also include: a post engaging flange 34 integrally connected to the bottom edge 10 of the base member 8 at an acute angle 38 for stiffening the base member 8 and formed with laterally spaced flange first and second fastener openings 35 and 39 therethrough; the first lower fastener member 18 in single shear is inserted through the flange first fastener opening 35 in the post engaging flange 34; the second lower fastener member 31 in single shear is inserted through the flange second fastener opening 39 in the post engaging flange 34; and a pair of base side flanges 36 and 37 integrally connected to opposite sides of the base member 8 for stiffening the base member 8.

Finally, the intermediate rail to post connection 1 may be constructed so that the first and second seat openings 14 and 27 are obround and the smaller widths 40 and 41 are oriented laterally and dimensioned across the smaller widths 40 and 41 to register with the first and second upper fastener members 15, and 28 in double shear to resist lateral movement of the sheet metal connector 7; and the flange first and second fastener openings 35 and 39 in the post engaging flange 34 are obround and dimensioned so that first and second lower fastener members 18 and 31 in single shear are dimensioned to engage the smaller widths 42 and 43 of the flange first and second obround fastener openings 35 and 39 to prevent lateral movement of the sheet metal connector 7.

Prong members 23 and 24 preferably should carry sharp points 44 and 45 for easy penetration of wood post 2 and have equally angled edges 46–49 so that the prong members will penetrate the wood post 2 in a straight line.

One of the features of the present invention is that the sheet metal connector 7 is semi-concealed. To accomplish this result, it is preferable that the area surrounding first upper fastener opening 11 be countersunk as at 50; first lower fastener opening 12 be countersunk as at 51; second upper fastener opening 25 be countersunk as at 52; and second lower fastener opening 26 be countersunk as at 53.

Figure 9:
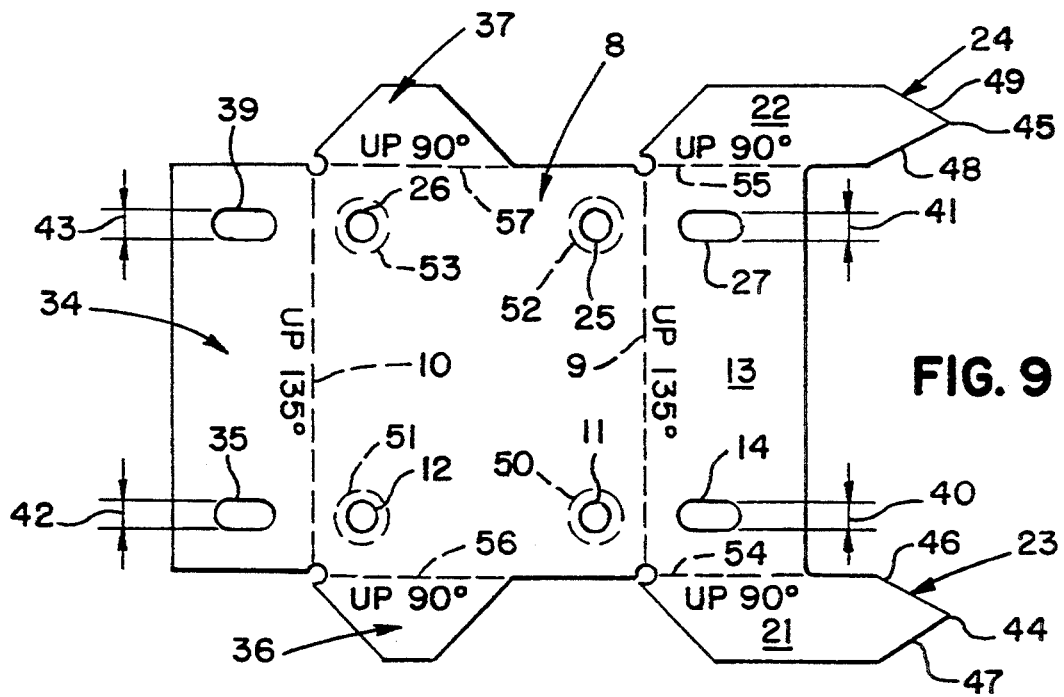
FIG. 9 is a plan view of the blank used in constructing the connector illustrated in FIG. 1.

In one form of the invention, the sheet metal connector 7 is constructed from an 18 gage galvanized blank as illustrated in FIG. 9 and formed by bending seat member 13 upwardly 135° along top edge line 9; bending post engaging flange 34 upwardly 135° along bottom edge line 10; bending side members 21 and 22 upwardly 90° along bend lines 54 and 55; and bending base side flanges 36 and 37 upwardly 90° along bend lines 56 and 57.

The blank may be cut from a metal piece about 3" in width and 4 and ⅛ long.

The fasteners may be either nails or self drilling screws.

In operation, the post to intermediate rail connection 1 is made as follows: First, the exact elevation of bottom face 6 in relation to wood supporting post 2 is determined. Second, prong members 23 and 24 are driven into wood supporting post 2 so that seat member 13 is at the predetermined elevation of bottom face 6 of intermediate wood rail 4. Third, first and second lower fastener members 18 and 31 are inserted into wood supporting post 2. Fourth, intermediate wood rail 4 is placed on sheet metal connector 7 with its bottom face 6 resting on seat member 13 and with its end face 5 in registration with side face 3 of wood supporting post 2. Fifth, and finally, first and second upper fastener members 15 and 28 are inserted through first and second upper fastener openings 11 and 25, through first and second seat openings 14 and 27, through intermediate wood rail 4, through end face 5 and into wood supporting post 2.

The unique holding ability of the post to intermediate rail connection 1 may be understood by reference to FIG. 8 and the following explanation. Five major factors contribute to the support of the intermediate wood rail 4 as follows: (1) first and second lower fastener members 18 and 31 attached to the base member 8 and wood supporting post 2 support seat member 13 upon which intermediate wood rail 4 rests; (2) prong members 23 and 24 are inserted into wood supporting post 2 and support seat member 13 upon which intermediate wood rail 4 rests; (3) first and second upper fastener members 15 and 28 connect base member 8 to wood supporting post 2 which supports seat 13 upon which intermediate wood rail 4 rests; and (4) and finally, first and second upper fastener members 15 and 28 directly connect intermediate wood rail 4 to wood supporting post 2 by passing through intermediate wood rail 4.

The fourth and last factor listed immediately above is the most important factor and deserves further attention. Since first and second fastener members 15 and 28 have their shanks 17 and 30 adjacent heads 29 and 32 supported by base member 8 and since the fastener members 15 and 28 pass through the intermediate wood rail 4 as well as wood supporting post 2, both first and second upper fastener members 15 and 28 are in "double shear" at the intersection of fastener members 15 and 28 with end face 5 of intermediate wood rail 4 and side face 3 of wood supporting post 2. By ICBO (International Code of Building Officials) code, fasteners held in "double shear" are rated at twice the shear value of fasteners in single shear. This increase in strength is further explained in my U.S. Pat. No. 4,480,941 granted Nov. 6, 1984 on this particular phenomenon.

Lateral holding of the intermediate wood rail 4 is provided in three ways as illustrated in FIG. 8 and explained as follows: (1) First and second upper fastener members 15 and 28 inserted through intermediate wood rail 4 and into wood supporting post 2; (2) Prong members 23 and 24 inserted into wood supporting post 2, and (3) first and second lower fastener members 18 and 31 inserted into wood supporting post 2 prevent lateral movement of base member 8 which in turn assist prong members 23 and 24 from moving laterally and also assist in preventing first and second upper fastener members 15 and 28 from moving laterally due to the interlock with base member 8 at fastener heads 29 and 32. In providing lateral resistance, it is to be understood that obround openings 14, 27, 35 and 39 have a width 40, 41, 42 and 43 in the lateral direction which is only slightly larger than the diameter of the fasteners which pierce those openings.

Further contributing to the lateral stability of the sheet metal connector 7 is the fact that first and second lower fastener members 18 and 31 intersect and engage two metal planes, viz.; base member 8 and post engaging flange 34; and first and second upper fastener members 15 and 28 likewise intersect and engage two planes, viz.; base member 8 and seat member 13.

The dimensions given are for illustrative purposes only. The sheet metal connector can be sized to hold intermediate wood rails from 2"×2", 2"×3", to 2"×4". The wood supporting post can be of any dimension so long as it meets code requirements for railing posts.

The term "intermediate wood rail" is used to indicate its best use. The term "post to Intermediate rail connection" thus could apply to a railing used as a top railing so long as either the post 2 extended above the upper face of the intermediate wood rail 4 or the intermediate wood rail 4 had a thickness so that the first and second upper fasteners members 15 and 28 did not extend above the end of wood supporting post 2.

I claim:

1. An intermediate rail to post connection comprising:
   a. a wood supporting post having a side face;
   b. an intermediate wood rail having an end face in registration with said side face of said wood supporting post, and a bottom face;
   c. a sheet metal connector including:
      (1) a base member having a top edge in registration with said bottom face of said intermediate wood rail, and a bottom edge in registration with said side face of said wood supporting post and formed with a first upper fastener opening and a first lower fastener opening;
      (2) a seat member integrally connected to said top edge of said base member in registration with said bottom face of said intermediate wood railing and formed with a first seat opening therethrough;
      (3) a first upper fastener member in double shear having an enlarged head in engagement with said base member and a shank inserted through and in registration with the sides of said first upper fastener opening in said base member, through said bottom face and said end face of said intermediate wood rail and into said wood supporting post; and
      (4) a first lower fastener member in single shear having an enlarged head in engagement with said base member and a shank inserted through said first lower fastener opening in said base member and into said wood supporting post.

2. An intermediate rail to post connection as described in claim 1 comprising:
   a. a pair of side members integrally connected to opposite sides of said seat member at an angle thereto for stiffening said seat member.

3. An intermediate rail to post connection as described in claim 2 comprising:
   a. a pair of prong members integrally connected to said pair of side members and extending into said wood supporting post.

4. An intermediate rail to post connection as described in claim 1 comprising:
   a. said base member is formed with a second upper fastener opening and a second lower fastener opening;
   b. said seat member is formed with a second seat opening therethrough;
   c. a second upper fastener member in double shear having an enlarged head in engagement with said base member and a shank inserted through said second upper fastener opening in said base member, through said second seat opening in said seat member, through said bottom face and said end face of said intermediate wood rail and into said wood supporting post; and
   d. a second lower fastener member in single shear having an enlarged head in engagement with said base member and a shank inserted through said second lower fastener opening in said base member, and into said wood supporting post.

5. An intermediate rail to post connection comprising:
   a. a wood supporting post having a side face;
   b. an intermediate wood rail having an end face in registration with said side face of said wood supporting post, and a bottom face;
   c. a sheet metal connector including:
      (1) a base member having a top edge in registration with said bottom face of said intermediate wood rail, and a bottom edge in registration with said side face of said wood supporting post and formed with a first upper fastener opening and a first lower fastener opening;
      (2) a first upper fastener member in double shear having an enlarged head in engagement with said base member and a shank inserted through said first upper fastener opening in said base member, through said bottom face and said end face of said intermediate wood rail and into said wood supporting post; and
      (3) a first lower fastener member in single shear having an enlarged head in engagement with said base member and a shank inserted through said first lower fastener opening in said base member and into said wood supporting post.

6. An intermediate rail to post connection as described in claim 5 comprising:
   a. a post engaging flange integrally connected to said bottom edge of said base member at an acute angle for stiffening said base member and formed with a flange first fastener opening therethrough; and
   b. said first lower fastener member in single shear is inserted through said flange first fastener opening in said post engaging flange.

7. An intermediate rail to post connection as described in claim 6 comprising:
   a. a pair of base side flanges integrally connected to opposite sides of said base member for stiffening said base member.

8. An intermediate rail to post connection as described in claim 4 comprising:
   a. a post engaging flange integrally connected to said bottom edge of said base member at an acute angle for stiffening said base member and formed with laterally spaced flange first and second fastener openings therethrough;
b. said first lower fastener member in single shear is inserted through said flange first fastener opening in said post engaging flange;
c. said second lower fastener member in single shear is inserted through said flange second fastener opening in said post engaging flange; and
d. a pair of base side flanges integrally connected to opposite sides of said base member for stiffening said base member.

9. An intermediate rail to post connection as described in claim 8 wherein:

a. said first and second seat openings are obround and said smaller widths are oriented laterally and dimensioned across said smaller widths to register with said first and second fastener members in double shear to resist lateral movement of said sheet metal connector; and
b. said flange first and second fastener openings in said post engaging flange are obround and dimensioned so that first and second lower fastener members in single shear are dimensioned to engage the smaller widths of said flange first and second obround fastener openings to prevent lateral movement of said sheet metal connector.

* * * * *